US008943026B2

(12) United States Patent
Giampaolo et al.

(10) Patent No.: US 8,943,026 B2
(45) Date of Patent: Jan. 27, 2015

(54) VISUAL REPRESENTATION OF A LOCAL BACKUP

(75) Inventors: Dominic B. Giampaolo, Mountain View, CA (US); Eric Weiss, Paris (FR); Kristen A. McIntyre, Fremont, CA (US); Pavel Cisler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 13/350,537

(22) Filed: Jan. 13, 2012

(65) Prior Publication Data

US 2012/0185438 A1 Jul. 19, 2012

Related U.S. Application Data

(60) Provisional application No. 61/433,164, filed on Jan. 14, 2011.

(51) Int. Cl.
| G06F 7/00 | (2006.01) |
| G06F 17/00 | (2006.01) |
| G06F 17/30 | (2006.01) |
| G06F 13/14 | (2006.01) |

(52) U.S. Cl.
CPC ............................... G06F 17/30233 (2013.01)
USPC ........................................................ 707/654

(58) Field of Classification Search
USPC .................. 707/625, 722, 769, 654, 999.204
See application file for complete search history.

(56) References Cited

U.S. PATENT DOCUMENTS

| 5,150,407 A | 9/1992 | Chan |
| 5,150,473 A | 9/1992 | Zulch |
| 5,163,148 A | 11/1992 | Walls |
| 5,276,867 A | 1/1994 | Kenley et al. |
| 5,349,658 A | 9/1994 | O'Rourke et al. |
| 5,369,570 A | 11/1994 | Parad |
| 5,659,614 A | 8/1997 | Bailey |

(Continued)

FOREIGN PATENT DOCUMENTS

| EP | 0629950 | 12/1997 |
| EP | 1152352 | 11/2001 |

(Continued)

OTHER PUBLICATIONS

Anonymous, "ForeverSaveVersion 1.1.3", Published Jan. 1, 2009, 16 pgs [online] Retrieved from the Internet: <URL: http://tool-forcesw.com/docs/ForeverSave_Manual.pdf>.

(Continued)

Primary Examiner — Usmaan Saeed
Assistant Examiner — Cecile Vo
(74) Attorney, Agent, or Firm — Fish & Richardson P.C.

(57) ABSTRACT

Methods, systems, and apparatus, including computer programs encoded on a computer storage medium, for storing data. In one aspect, a method includes receiving a user input to present a visual representation of a first prior state of a file system; generating the first visual representation of a first prior state of the file system at a first time in the past according to a first virtual file system corresponding to that first time; presenting the first visual representation, where the first virtual file system is a reduced representation of the file system at that first time; receiving a user input to present a second visual representation of a second prior state of the file system at a second time in the past according to a second virtual file system corresponding to that second time; and presenting the second visual representation.

5 Claims, 8 Drawing Sheets

(56) References Cited

U.S. PATENT DOCUMENTS

| | | |
|---|---|---|
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,802,175 A | 9/1998 | Kara |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,097,313 A | 8/2000 | Takahashi et al. |
| 6,112,318 A | 8/2000 | Jouppi et al. |
| 6,134,660 A | 10/2000 | Boneh et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,553,392 B1 | 4/2003 | Mosher, Jr. et al. |
| 6,574,733 B1 | 6/2003 | Langford |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,701,454 B1 | 3/2004 | Fischer et al. |
| 6,711,572 B2 | 3/2004 | Zakharov et al. |
| 6,714,201 B1 | 3/2004 | Grinstein et al. |
| 6,714,952 B2 | 3/2004 | Dunham et al. |
| 6,725,427 B2 | 4/2004 | Freeman et al. |
| 6,728,735 B1 | 4/2004 | Fong |
| 6,768,999 B2 | 7/2004 | Prager et al. |
| 6,785,751 B1 | 8/2004 | Connor |
| 6,785,786 B1 | 8/2004 | Gold et al. |
| 6,801,229 B1 | 10/2004 | Tinkler |
| 6,836,657 B2 | 12/2004 | Ji et al. |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,947,556 B1 | 9/2005 | Matyas et al. |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,069,402 B2 | 6/2006 | Coulter et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 | 11/2006 | Saha et al. |
| 7,134,026 B2 | 11/2006 | Horiuchi et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,257,717 B2 | 8/2007 | Huang |
| 7,275,075 B2 | 9/2007 | Cannon |
| 7,284,190 B2 | 10/2007 | Chellis et al. |
| 7,289,973 B2 | 10/2007 | Kiessig et al. |
| 7,318,134 B1 | 1/2008 | Oliveira et al. |
| 7,320,076 B2 | 1/2008 | Caronni |
| 7,386,801 B1 | 6/2008 | Horvitz et al. |
| 7,401,194 B2 | 7/2008 | Jewell |
| 7,418,619 B1 | 8/2008 | Uhlmann et al. |
| 7,434,164 B2 | 10/2008 | Salesin et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,574,459 B2 | 8/2009 | Sen et al. |
| 7,590,668 B2 | 9/2009 | Kathuria et al. |
| 7,596,586 B2 | 9/2009 | Gokhale et al. |
| 7,600,133 B2 | 10/2009 | Long et al. |
| 7,620,670 B2 | 11/2009 | Tokuda et al. |
| 7,624,133 B1 | 11/2009 | Ojalvo |
| 7,630,021 B2 | 12/2009 | Matsuzaka et al. |
| 7,657,450 B2 | 2/2010 | Amit et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,711,771 B2 | 5/2010 | Kirnos |
| 7,734,594 B2 | 6/2010 | Wang |
| 7,739,464 B1 | 6/2010 | Coulter et al. |
| 7,739,622 B2 | 6/2010 | DeLine et al. |
| 7,761,456 B1 | 7/2010 | Cram et al. |
| 7,809,687 B2 | 10/2010 | Cisler et al. |
| 7,809,688 B2 | 10/2010 | Cisler et al. |
| 7,836,311 B2 | 11/2010 | Kuriya et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,882,072 B1 | 2/2011 | Axe et al. |
| 7,890,527 B1 * | 2/2011 | Nene et al. ............ 707/769 |
| 7,934,064 B1 | 4/2011 | Per et al. |
| 7,974,948 B2 | 7/2011 | Baer et al. |
| 8,010,900 B2 | 8/2011 | Hart et al. |
| 8,024,292 B2 | 9/2011 | Thompson et al. |
| 8,055,911 B2 | 11/2011 | Feng et al. |
| 8,099,392 B2 | 1/2012 | Paterson et al. |
| 8,166,415 B2 | 4/2012 | Cisler et al. |
| 8,209,308 B2 | 6/2012 | Rueben et al. |
| 8,219,995 B2 | 7/2012 | Flemming et al. |
| 8,229,897 B2 | 7/2012 | Cannon et al. |
| 8,245,078 B1 | 8/2012 | Chatterjee et al. |
| 8,260,770 B2 * | 9/2012 | Bell et al. ............ 707/722 |
| 8,307,004 B2 | 11/2012 | Weiss et al. |
| 8,311,988 B2 | 11/2012 | Cisler et al. |
| 8,352,702 B2 | 1/2013 | O'Neill et al. |
| 8,370,853 B2 | 2/2013 | Giampaolo et al. |
| 8,468,136 B2 | 6/2013 | Ulrich et al. |
| 8,495,024 B2 | 7/2013 | Cisler et al. |
| 8,504,516 B2 | 8/2013 | Weiss et al. |
| 8,504,527 B2 | 8/2013 | Cisler et al. |
| 8,566,289 B2 | 10/2013 | Paterson et al. |
| 8,725,965 B2 | 5/2014 | Hart et al. |
| 8,745,523 B2 | 6/2014 | McInerney et al. |
| 8,775,378 B2 | 7/2014 | Cisler et al. |
| 2001/0047368 A1 | 11/2001 | Oshinsky et al. |
| 2001/0055317 A1 | 12/2001 | Kajizaki et al. |
| 2002/0016912 A1 | 2/2002 | Johnson |
| 2002/0023198 A1 | 2/2002 | Kokubun et al. |
| 2002/0046220 A1 | 4/2002 | Freeman et al. |
| 2002/0049883 A1 | 4/2002 | Schneider et al. |
| 2002/0054158 A1 | 5/2002 | Asami |
| 2002/0063737 A1 | 5/2002 | Feig et al. |
| 2002/0065999 A1 | 5/2002 | Kikuchi et al. |
| 2002/0080180 A1 | 6/2002 | Mander et al. |
| 2002/0107886 A1 | 8/2002 | Gentner et al. |
| 2002/0112237 A1 | 8/2002 | Kelts |
| 2002/0120648 A1 | 8/2002 | Ball et al. |
| 2002/0156921 A1 | 10/2002 | Dutta et al. |
| 2002/0160760 A1 | 10/2002 | Aoyama |
| 2002/0174283 A1 | 11/2002 | Lin |
| 2003/0014521 A1 | 1/2003 | Elson et al. |
| 2003/0016248 A1 | 1/2003 | Hayes Ubillos |
| 2003/0018878 A1 | 1/2003 | Dorward et al. |
| 2003/0050940 A1 | 3/2003 | Robinson |
| 2003/0063128 A1 | 4/2003 | Salmimaa et al. |

(56) References Cited

U.S. PATENT DOCUMENTS

| | | |
|---|---|---|
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0182332 A1 | 9/2003 | McBrearty et al. |
| 2003/0195903 A1 | 10/2003 | Manley et al. |
| 2003/0220949 A1 | 11/2003 | Witt et al. |
| 2004/0044707 A1 | 3/2004 | Richard |
| 2004/0066414 A1 | 4/2004 | Czerwinski et al. |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0117459 A1 | 6/2004 | Fry |
| 2004/0125137 A1 | 7/2004 | Stata et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0163009 A1 | 8/2004 | Goldstein et al. |
| 2004/0167942 A1 | 8/2004 | Oshinsky et al. |
| 2004/0175000 A1 | 9/2004 | Caronni |
| 2004/0193953 A1 | 9/2004 | Callahan et al. |
| 2004/0199779 A1 | 10/2004 | Huang |
| 2004/0199826 A1 | 10/2004 | Bertram et al. |
| 2004/0210608 A1 | 10/2004 | Lee et al. |
| 2004/0220965 A1 | 11/2004 | Harville et al. |
| 2004/0220980 A1 | 11/2004 | Forster |
| 2004/0228493 A1 | 11/2004 | Ma |
| 2004/0230892 A1 | 11/2004 | Horton |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2004/0236958 A1 | 11/2004 | Teicher et al. |
| 2004/0267700 A1 | 12/2004 | Dumais et al. |
| 2005/0010955 A1 | 1/2005 | Elia et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0108253 A1 | 5/2005 | Metsatahti et al. |
| 2005/0138013 A1 | 6/2005 | Walker et al. |
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216520 A1 | 9/2005 | He et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0036568 A1 | 2/2006 | Moore et al. |
| 2006/0041603 A1 | 2/2006 | Paterson et al. |
| 2006/0041823 A1 | 2/2006 | Wolfgang et al. |
| 2006/0053332 A1 | 3/2006 | Uhlmann et al. |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0085817 A1 | 4/2006 | Kim et al. |
| 2006/0088167 A1 | 4/2006 | Bade et al. |
| 2006/0101384 A1 | 5/2006 | Sim-Tang et al. |
| 2006/0106893 A1 | 5/2006 | Daniels et al. |
| 2006/0117309 A1 | 6/2006 | Singhal et al. |
| 2006/0129496 A1 | 6/2006 | Chow et al. |
| 2006/0137010 A1 | 6/2006 | Kramer et al. |
| 2006/0143250 A1 | 6/2006 | Peterson et al. |
| 2006/0150107 A1 | 7/2006 | Leung et al. |
| 2006/0156246 A1 | 7/2006 | Williams et al. |
| 2006/0161861 A1 | 7/2006 | Holecek et al. |
| 2006/0173848 A1 | 8/2006 | Peterson et al. |
| 2006/0200754 A1 | 9/2006 | Kablesh et al. |
| 2006/0218363 A1 | 9/2006 | Palapudi |
| 2006/0224956 A1 | 10/2006 | Storisteanu et al. |
| 2006/0235907 A1 | 10/2006 | Kathuria et al. |
| 2006/0236406 A1 | 10/2006 | Johnson |
| 2006/0248294 A1 | 11/2006 | Nedved et al. |
| 2006/0253470 A1 | 11/2006 | Friedman et al. |
| 2006/0288205 A1 | 12/2006 | Linares |
| 2007/0027935 A1 | 2/2007 | Haselton et al. |
| 2007/0030528 A1 | 2/2007 | Quaeler et al. |
| 2007/0038884 A1 | 2/2007 | Campbell et al. |
| 2007/0043715 A1 | 2/2007 | Kaushik et al. |
| 2007/0043790 A1 | 2/2007 | Kryger |
| 2007/0070066 A1 | 3/2007 | Bakhash |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0136381 A1 | 6/2007 | Cannon et al. |
| 2007/0136389 A1 | 6/2007 | Bergant et al. |
| 2007/0136423 A1 | 6/2007 | Gilmore et al. |
| 2007/0143425 A1 | 6/2007 | Kieselbach et al. |
| 2007/0150326 A1 | 6/2007 | Nakao et al. |
| 2007/0156772 A1 | 7/2007 | Lechner |
| 2007/0168497 A1 | 7/2007 | Locker et al. |
| 2007/0174580 A1 | 7/2007 | Shulga |
| 2007/0180268 A1 | 8/2007 | Filimon et al. |
| 2007/0185879 A1 | 8/2007 | Roublev et al. |
| 2007/0185922 A1 | 8/2007 | Kapoor et al. |
| 2007/0186127 A1 | 8/2007 | Desai et al. |
| 2007/0192386 A1 | 8/2007 | Fries et al. |
| 2007/0266007 A1 | 11/2007 | Arrouye et al. |
| 2007/0271263 A1 | 11/2007 | Merrild |
| 2007/0271303 A1 | 11/2007 | Menendez et al. |
| 2007/0282854 A1 | 12/2007 | Bhogal et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034017 A1 | 2/2008 | Giampaolo et al. |
| 2008/0034019 A1 | 2/2008 | Cisler et al. |
| 2008/0046557 A1 | 2/2008 | Cheng |
| 2008/0065663 A1 | 3/2008 | Farlee et al. |
| 2008/0070496 A1 | 3/2008 | Jackson |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126442 A1 | 5/2008 | Cisler et al. |
| 2008/0141029 A1 | 6/2008 | Culver |
| 2008/0162999 A1* | 7/2008 | Schlueter et al. ............ 714/33 |
| 2008/0168184 A1 | 7/2008 | Freedman et al. |
| 2008/0168245 A1* | 7/2008 | De Atley et al. ............ 711/162 |
| 2008/0168391 A1 | 7/2008 | Robbin et al. |
| 2008/0172428 A1 | 7/2008 | Stokes |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250342 A1 | 10/2008 | Clark et al. |
| 2008/0250400 A1 | 10/2008 | Vertes |
| 2008/0285754 A1 | 11/2008 | Kezmann |
| 2008/0307017 A1 | 12/2008 | Lyons et al. |
| 2008/0307020 A1 | 12/2008 | Ko et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0116641 A1 | 5/2009 | Bokor et al. |
| 2009/0307333 A1* | 12/2009 | Welingkar et al. ............ 709/219 |

(56) References Cited

U.S. PATENT DOCUMENTS

| | | |
|---|---|---|
| 2010/0017855 A1 | 1/2010 | Johnson et al. |
| 2010/0063960 A1 | 3/2010 | Lehto |
| 2010/0070844 A1 | 3/2010 | Aymeloglu et al. |
| 2010/0169823 A1 | 7/2010 | Audet |
| 2010/0205397 A1 | 8/2010 | Chellam |
| 2010/0217929 A1 | 8/2010 | Kirshenbaum et al. |
| 2011/0016089 A1 | 1/2011 | Freedman et al. |
| 2011/0185762 A1 | 1/2011 | Freedman et al. |
| 2011/0083098 A1 | 4/2011 | Cisler et al. |
| 2011/0202763 A1 | 8/2011 | Martin et al. |
| 2011/0296351 A1 | 12/2011 | Ewing et al. |
| 2011/0302502 A1 | 12/2011 | Hart et al. |
| 2012/0185518 A1 | 7/2012 | Giampaolo et al. |
| 2012/0185762 A1 | 7/2012 | Ozer et al. |
| 2012/0185767 A1 | 7/2012 | Schlegel |
| 2012/0198383 A1 | 8/2012 | Cisler et al. |
| 2012/0246565 A1 | 9/2012 | Kumamoto |
| 2012/0272173 A1 | 10/2012 | Grossman et al. |
| 2013/0066836 A1 | 3/2013 | Weiss et al. |
| 2013/0073821 A1 | 3/2013 | Flynn et al. |
| 2013/0212599 A1 | 8/2013 | Giampaolo et al. |

FOREIGN PATENT DOCUMENTS

| | | |
|---|---|---|
| EP | 1582982 | 10/2005 |
| WO | WO 01/06356 | 1/2001 |
| WO | WO 02/101540 | 12/2002 |
| WO | WO 2005/045756 | 5/2005 |
| WO | WO 2008/019237 | 2/2008 |
| WO | WO 2008/019259 | 2/2008 |

OTHER PUBLICATIONS

"Apple Previews Mac OS X Leopard," Aug. 7, 2006, [Online] [Retrieved on Nov. 26, 2007] Retrieved from the Internet: URL:http://www.apple.com/pr/library/2006/aug/07leopard.html, pp. 1-2.

"Aulaclic: Unit 6. The Recycle Bin," Nov. 2005, [Online] [Retrieved on Nov. 26, 2007] Retrieved from the Internet: URL:http://www.teacherclick.com/winxp/t_6_1.htm, pp. 1-2.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

"MSDN Academic Alliance Developer Center, Curriculum Repository Glossary," [Online] [Retrieved on Apr. 22, 2009] Retrieved from the Internet URL: http://www.academicresourcecenter.net/curriculum/glossary.aspx, 4 pages.

"StorageSync: Backup, Restore, & Synchronization Software User's Guide", SimpleTech, 2003, 100 pages.

"What's New in Word 2002," Wellesly College Information Services Computing Documentation, Jan. 2002, [Online] Retrieved on Aug. 14, 2008] Retrieved from the Internet URL: http://www.wellesley.edu/Computing/Office02/Word02/word02.html, 19 pages.

Bonwick et al., "The Zettabyte File System," [Online] [Retrieved on Jan. 22, 2008] Retrieved from the Internet: URL:http://partneradvantage.sun.com/protected/solaris10/adoptionkit/tech/zfs/zfs_overview.pdf, 13 pages.

Bonwick, "ZFS the Last Word in File Systems," [Online] [Retrieved on Jan. 22, 2008] Retrieved from the Internet: URL:http://opensolaris.org/os/community/zfs/docs/zfs.pdf, 34 pages.

Bott, "Windows XP Backup Made Easy," [Online] [Retrieved on Jul. 7, 2009]; Retrieved from the Internet URL: http://www.microsoft.com/windowsxp/using/setup/learnmore/bott_03july14.mspx, 4 pages.

Rubin et al., "Microsoft Office Word 2003, Official Manual", First Edition, Japan, Nikkei BP Softpress, Jul. 12, 2004, vol. 1, p. 300, 815-818.

Chen et al., "Data Redundancy and Compression Methods for a Disk-based Network Backup System", 2004, IEEE, pp. 1-8.

Engst, "Retrospect 6.0: Powerful Backup Program Adds Panther Compatibility and Enterprise Features," [Online] [Retrieved on Jul. 8, 2009]; Retrieved from the Internet URL: http://www.macworld.com/article/31038/2004/06/retrospect6x0.html, 8 pages.

Communication pursuant to Article 94(3) EPC for Application No. EP 07 813 540.7, dated Jun. 23, 2009, 2 pages.

Extended European Search Report and Written Opinion, European Application No. 11171738.5, Aug. 29, 2011, 5 pages.

Communication pursuant to Article 94(3) EPC for Application No. EP 07 799 899.5, dated May 14, 2009, 2 pages.

Communication pursuant to Article 94(3) EPC for Application No. EP 07 799 899.5, dated Oct. 7, 2009, 4 pages.

European Search Report dated Oct. 16, 2012 in EP Application No. 12150673, 9 pages.

Examination Report from European Application No. 07 813 540.7 dated Oct. 27, 2011, 5 pages.

Examination Report from European Application No. 07 813 593.6 dated Mar. 25, 2013, 4 pages.

Examination Report from European Application No. 07 813 605.8 dated Oct. 27, 2011, 5 pages.

Extended European Search Report, European Application No. 11184579.8, Nov. 17, 2011, 6 pages.

Godfrey et al., "Using Original Analysis to Detect Merging and Splitting of Source Code Entities," IEEE Transactions on Software Engineering, vol. 31, No. 2. Feb. 2005. pp. 166-181.

Griffiths, "Leopard first looks: Time Machine," Aug. 8, 2006 [Online] [Retrieved on Nov. 23, 2007] Retrieved from the Internet: URL:http://www.macworld.com/2006/08/firstlooks/leotimemac/index.php?pf=1, pp. 1-2.

Harder, "Microsoft Windows XP System Restore," [Online] [Retrieved on Jul. 7, 2009] Retrieved from the Internet URL: http://msdn.microsoft.com/en-us/library/ms997627.aspx, 8 pages.

In-Link Files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/in.html, 5 pages.

International Search Report and Written Opinion, PCT/US2007/074653, Aug. 14, 2008, 14 pages.

International Search Report and Written Opinion, PCT/US2007/074729, Jul. 12, 2007, 11 pages.

International Search Report and Written Opinion, PCT/US2007/074863 Apr. 21, 2009, 20 pages.

International Search Report and Written Opinion, PCT/US2007/074881, Jul. 12, 2007, 11 pages.

International Search Report and Written Opinion, PCT/US2008/065146, Oct. 31, 2008, 21 pages.

International Search Report and Written Opinion, PCT/US2008/066212, Mar. 9, 2009, 26 pages.

Microsoft Corporation, "Description of the AutoRecover Functions in Excel," [online] Microsoft Corporation, Aug. 10, 2007, Article ID 289273; URL: http://support.microsoft.com/kb/289273/en-us.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Microsoft-Technet, "Using Encrypting File System," Nov. 3, 2005, Microsoft, 40 pages.

Moorthy, "Linux Crontab: 15 Awesome Cron Job Examples," TheGeekStuff.com, Jun. 11, 2009, retrieved on Dec. 23, 2013, http://www.thegeekstuff.com/2009/06/15-practical-crontab-examples/, 6 pages.

Office Action dated Feb. 29, 2012 from related Chinese Application No. 200880024710.0, 11 pages.

Posey, "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

Rubel, "Easy Automated Snapshot-Style Backups with Rsync," [Online][Retrieved on Nov. 8, 2010] Retrieved from the Internet URL: http://www.mikerubel.org/computers/rsync_snapshots; 18 pages.

(56) References Cited

OTHER PUBLICATIONS

Shi et al., "USP: A Lightweight File System Management Framework," 2010 Fifth IEEE International Conference on Networking, Architecture, and Storage, 2010 IEEE, pp. 250-256.

Sun Microsystems, Inc., "ZFS On-Disk Specification," Draft: Dec. 9, 2005, [Online] [Retrieved on Jan. 22, 2008]; Retrieved from the Internet URL: http://opensolaris.org/os/community/zfs/docs/ondiskformat0822.pdf, 55 pages.

Tittel, "An EAZ Way to Restore Crippled and Inoperable Systems," ChannelWeb, Apr. 25, 2005, [Online] [Retrieved on Aug. 13, 2008] Retrieved from the Internet URL: http://www.crn.com/white-box/161502165, 10 pages.

Wang et al., "A Secure and Efficient Desktop Backup and Recovery System", 2007, IEEE, pp. 304-309.

\* cited by examiner

VISUAL REPRESENTATION OF A LOCAL BACKUP

CROSS-REFERENCE TO RELATED APPLICATIONS

This application claims the benefit under 35 U.S.C. §119(e) of the filing date of U.S. Patent Application No. 61/433,164, for Local Backup, which was filed on Jan. 14, 2011, and which is incorporated here by reference.

BACKGROUND

This specification relates to storing data.

Users can conventionally store data as part of one or more backups (e.g., of a file system or specified files or folders) to one or more external locations. Thus, if there is a failure to a user device, particular backup versions of data can be recovered. Typically, the data can only be viewed and recovered when the user device is connected to the corresponding external location having the backup data.

SUMMARY

This specification describes technologies relating to storing and presenting data.

In general, one aspect of the subject matter described in this specification can be embodied in methods that include the actions of receiving a user input to present a visual representation of a first prior state of a file system; generating the first visual representation of a first prior state of the file system at a first time in the past according to a first virtual file system corresponding to that first time; presenting the first visual representation, where the first virtual file system is a reduced representation of the file system at that first time; receiving a user input to present a second visual representation of a second prior state of the file system at a second time in the past according to a second virtual file system corresponding to that second time; and presenting the second visual representation. Other embodiments of this aspect include corresponding systems, apparatus, and computer programs recorded on computer storage devices, each configured to perform the operations of the methods.

These and other embodiments can each optionally include one or more of the following features. Generating the first visual representation includes performing a first set operation between the elements of the current file system and the elements of the first virtual file system to determine the contents of the first visual representation. Generating the second visual representation includes performing a second set operation between the elements of the result of first set operation and the elements of the second virtual file system to determine the contents of the second visual representation. The method further includes receiving an input to restore a data item presented in the first visual representation; identifying data corresponding to the presented data item from the corresponding virtual file system; and restoring the data to a current file system. The input to present a first prior state is received while presenting a current file system interface window and where the generating includes presenting a visual representation of the same file system interface window corresponding to an earlier point in time. The first virtual file system is generated from data stored in a delta store and associated with a first backup.

In general, one aspect of the subject matter described in this specification can be embodied in methods that include the actions of generating one or more local backups on a device while the device is disconnected from an external backup storage location; coupling the device to the external backup storage location; generating a backup on the external backup storage location corresponding to the current data of the device; identifying the one or more local backups on the client device; and migrating the one or more local backups to backups on the external backup storage location. Other embodiments of this aspect include corresponding systems, apparatus, and computer programs recorded on computer storage devices, each configured to perform the operations of the methods.

These and other embodiments can each optionally include one or more of the following features. Each of the local backups are migrated in order from newest to oldest. Each of the local backups are migrated in order from oldest to newest. Migrating a local backup includes a comparison of the data of the local backup with a next later backup on the remote storage location and a next earlier backup on the remote storage location.

Particular embodiments of the subject matter described in this specification can be implemented so as to realize one or more of the following advantages. Backup data can be stored locally when a user is disconnected from an external storage device. The locally stored backup can be captured in a compact virtual file system representation to reduce storage requirements. The local backup data can be stored in an analogous form to the external backups. Data changes can be captured for adding to the local backup prior to being made. A backup user interface can be presented that allows users to view visual representations of the virtual file system as if it were the actual file system at times in the past.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Backups of file system data can be made even when a user device is not coupled to an external storage device. In particular, a virtual file system can be generated that provides a compact representation of the file system during an epoch in order to generate a locally stored backup at the end of each epoch. An epoch is a specified period of time between each backup. The backups can be generated as snapshots of the file system for that epoch. The virtual file system is generated as versions of data items are added for inclusion in the backup. While the hierarchical file system of the actual file system is mimicked, directories above a given version being stored in the backup can be faults (e.g., zero data items). Additionally, the virtual file system can only include the portions of the file system in which changes have occurred, reducing storage space needed for a given backup. The data items added for inclusion in the backup can be copies of files captured prior to deletion or modification. Additionally, or alternatively, the data items can be markers indicating the type of change to the data item (e.g., a marker indicating a file has been deleted, modified, or moved).

Visual representations of each backup can be generated and presented in a backup interface. The visual representations present the backup file system data as it occurred at that point in time. In particular, the visual representation can be presented as a visual representation of a file system window corresponding to an actual file system window previously being presented except that the contents of the file system window correspond to the data present that the time of the backup operation. A user can interact with the visual representation. For example, a user can select one or more data items presented in the visual representation for restoration to the current file system. A user can also provide input to present a visual representation of a different (e.g., an earlier) backup.

Figure 1:
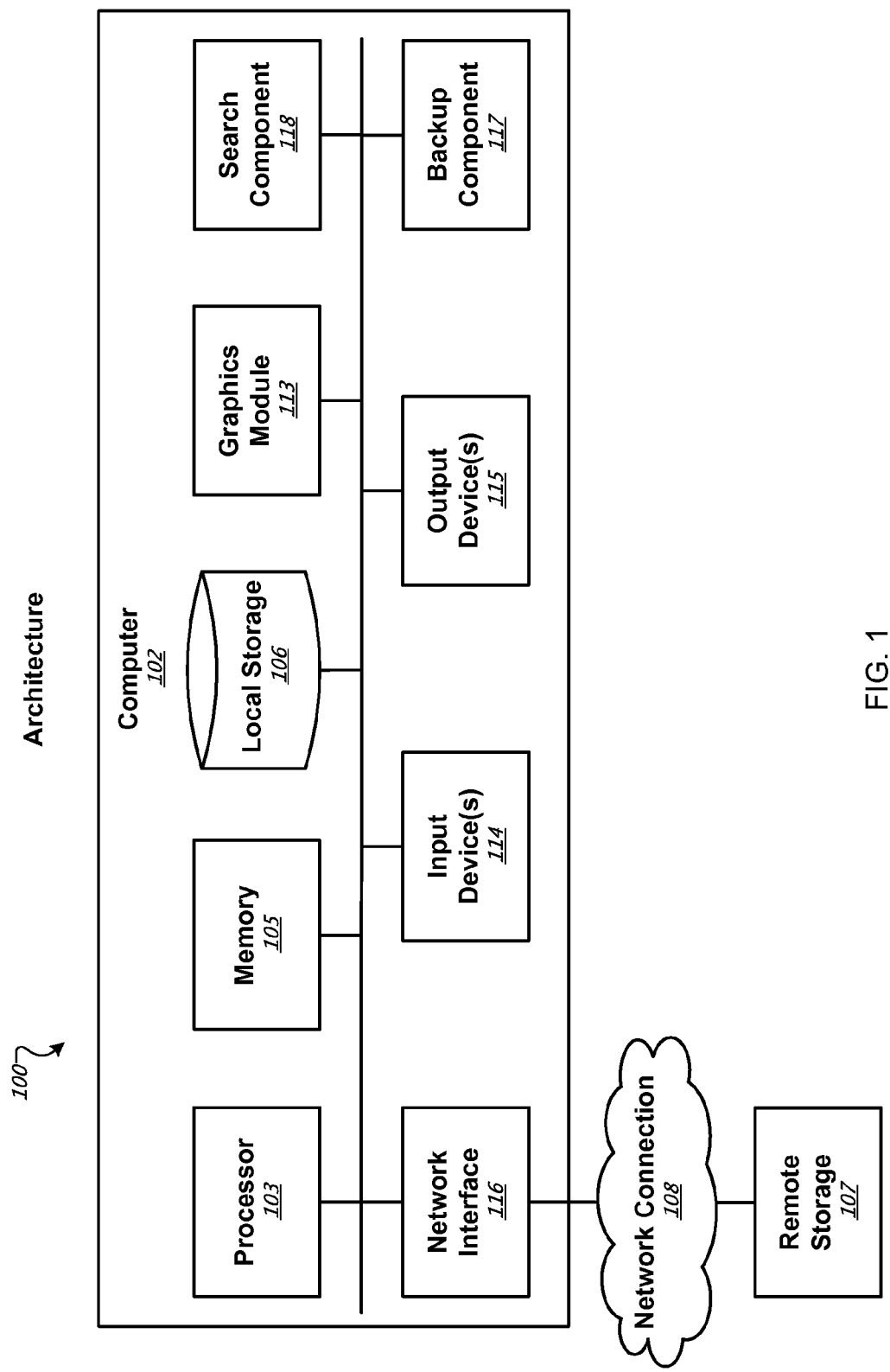
FIG. 1 is a block diagram of an example system.

FIG. 1 is a block diagram of an example system 100. The system 100 can allow a user to generate, view, navigate, and restore data, for example, in either remote backup storage or local backups. The system 100 can further provide visual representations of locally stored backup data as part of a virtual file system. The visual representation can correspond to a visual representation of a user interface window, for example, of a user interface window providing various file system information including, for example, icons, files, folders, or other data. The visual representation can be presented in a particular backup interface. However, rather than presenting a simple image of the user interface window, a user can interact with the visual representation to navigate through a hierarchy of windows or to select one or more individual data items presented within the visual representation. Various types of data items from a file system can be subjected to a backup operation by a backup component 117, e.g., files, folders, system settings, metadata, state information, etc.

The system 100 includes a computing device 102 (e.g., a personal computer such as a desktop or notebook computer, a tablet device, a mobile device, etc.) communicatively coupled to a remote storage 107 through a network interface 116 and a network 108 (e.g., local area network, wide area network, wireless network, Internet, intranet, etc.). The computing device 102 generally includes a processor 103, a memory 105, one or more input devices 114 (e.g., keyboard, mouse, etc.), and one or more output devices 115 (e.g., a display device). A user interacts with the system 100, for example, using the input and output devices 114, 115. The system 100 includes various hardware elements. The system 100 can include hardware, software, and combinations of the two.

The computing device 102 also includes a local storage device 106 and a graphics module 113 (e.g., a graphics card) for storing information and generating graphical objects, respectively. The local storage device 106 can be used to store backup data as part of a virtual file system. In some implementations, backup data is stored locally only when the computing device 102 is not connected to the remote storage 107.

Though discussion is made with reference representations of user interfaces, theses visual representations can be based on various data structures, files, processes, and other aspects of information management. Modification to file structures, data and the like is also contemplated in order to achieve various interactions and displays of the visual representation.

The computing device 102 includes the backup component 117 that allows for the storage of versions of file system data (e.g., files or other items), for example within the local storage 106 or in an external storage repository (e.g., remote storage 107) as part of a backup operation. In some implementations, the backup component 117 also allows a user to select any of the stored versions and use it to initiate a restoration of backup data corresponding to that version in the computing device 102 (e.g., a restoration of a file to the current file system). In some implementations, separate backup components 117 are used for local backups and external backups.

In some implementations, the computing device 102 includes a search component 118 that allows for searches of the computer's files or other items, for example within the local storage 106 or an external storage repository. This can include searching locally stored backup information within the virtual file system. In some implementations, the search component 118 can interact with the backup component 117 to perform searches of stored versions of files or other items on the computing device 102. Particularly, in one implementation, the search component 118 provides that a user can select search results identified in an earlier version and use them to initiate a restoration of that version in the computing device 102.

In some implementations, when a user searches for a file but the file is not found, the user can invoke the backup component 117 (or a portion thereof) to show one or more previous backup states corresponding to, for example, the various locations within a hierarchical file system for a specific earlier point in time. For example, if the user is looking for content of the C: drive (that does not currently hold the sought file), the user (or the computer) can launch a backup component to present visual representations of previous states of the C: drive to see if the file has been included in a backup (either locally or, if connected, on a remote storage device). This operation can be facilitated by the search environment forwarding information (e.g., an identity of the sought file) to the backup environment for showing the correct archive(s).

Figure 2:
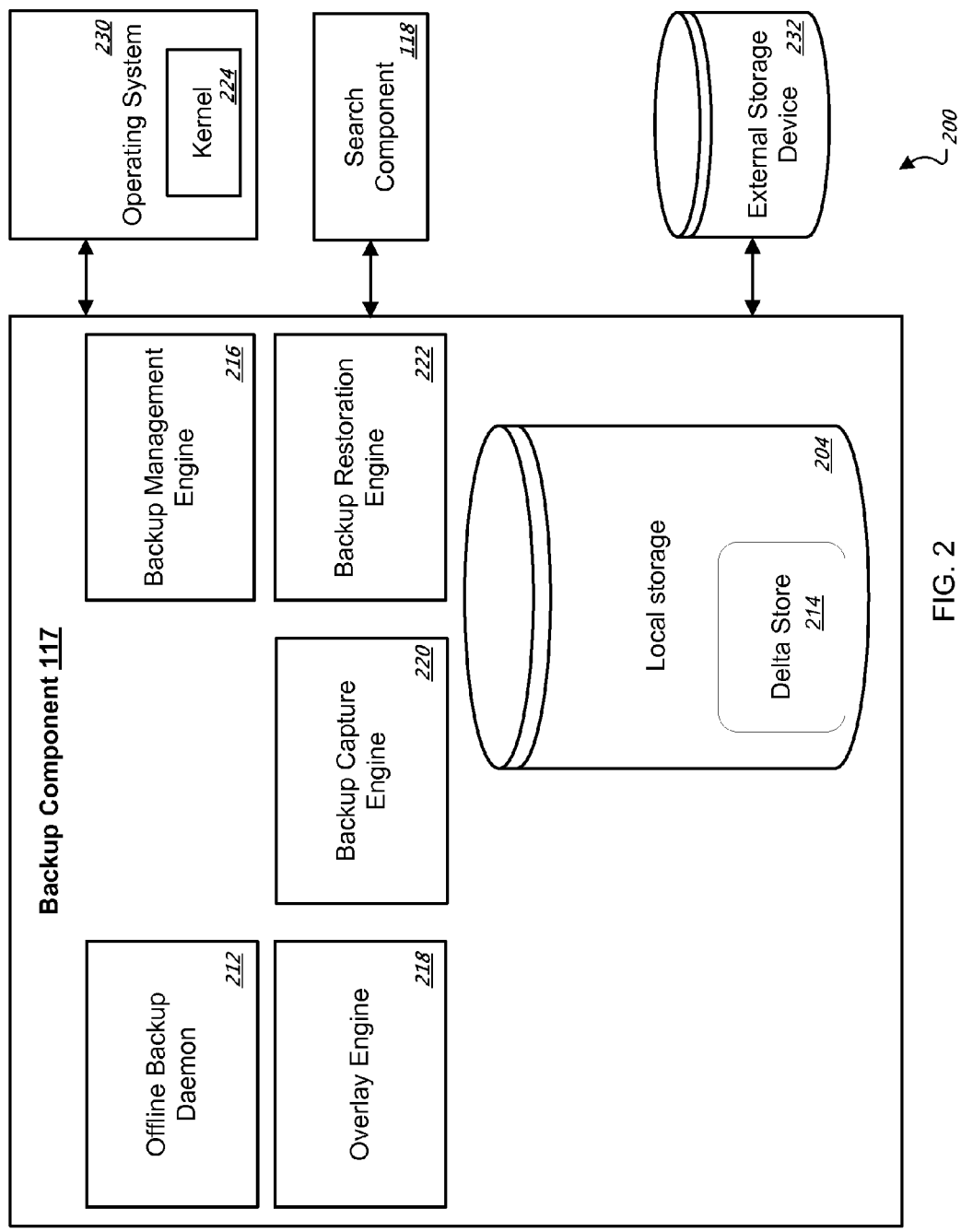
FIG. 2 is a block diagram of an example architecture for the local backup and restoration of data.

FIG. 2 is a block diagram of an example architecture 200 for the local backup and restoration of data. The data can include, e.g., files such as application files or system files, application data, settings, parameters etc. The backup component 117 provides backup and restoration capability for the system. Many different items or elements can be the subject of a backup operation in the system. For example, folders, files, items, information portions, directories, images, system parameters, playlists, address books, e-mails, e-mail folders, a state of an application or state of the system, preferences (e.g., user or system preferences), etc. all can be included in one or more backup operations.

In this example, the backup component 117 includes a local storage device 204 and an external storage device 232. Backup data can be stored on either. In particular, backups can be periodically stored on the external storage device 232 according to particular backup criteria (e.g., as defined by a backup application or a user). Additionally, particular backup data can be stored on the local storage device 204. Specifically, in some implementations, a delta store 214 can be used to temporarily store local backups when the user's device is not connected to the external storage device 232. The delta store can be used to generate a virtual file system, e.g., based on an encoded representation of the file system stored in the delta store. In particular, the encoded representation of the file system can encode a particular file system state and include incremental changes to data items, e.g., changed data for particular files, added files, deleted files, or moved files. In some implementations, the virtual file system provides a read-only synthetic representation of how the backup of the file system would appear as a full file system backup instead of including just the changes to the file system. The virtual file system can be generated on the fly from the delta store's encoded representation in order to provide a visual representation of the backup, as described in greater detail below.

Once the connection to the external storage device 232 has been reestablished, the temporary backup data can be converted into one or more backups on the external storage device 232 using a migration process.

Various numbers of local and/or external storage devices can be used by the backup component 117 for storing backup data corresponding to the versions. In some implementations, the backup component 117 stores the backup data in a format corresponding to a file system structure. However, storage on the local storage device 204 can be a reduced representation of the file system hierarchy. In particular, the local storage device 204 includes the delta store 214 in which incremental changes to data for local backups are stored.

In some implementations, the backup component 117 runs as a background task on an operating system 230, where the task is generally not visible to the user. In particular, the backup component can operate in coordination with a kernel 224 of the operating system in order to identify triggering events for backup operations. For example, a particular triggering event can be a type of file operation, e.g., an incoming write call for a modification to a file. In response to the trigger, the kernel can facilitate a copy of the unmodified version of the file being stored in the local storage prior to allowing the file operation to proceed. The backup component 117 can be configured to run across multiple user accounts.

A backup management engine 216 coordinates the collection, storage, and retrieval of backups performed by the backup component 117. For example, the backup management engine 216 can manage the triggering events for storing data, the frequency of performing backups, as well as determine whether a backup is to be performed on the external storage device 232 or whether a local backup is to be generated.

A backup capture engine 220 stores data to the local storage 204 identified for inclusion of a backup during an epoch from which a particular virtual file system representation can be generated. The backup capture engine 220 can also generate and store markers and other metadata within the local storage 204 providing information about the data items stored in the delta store 214, these markers can then be used when generating each particular virtual file system representation from the delta store 214. The backup capture engine 220 can also store identified data to the external storage device 232 during particular backup operations. The backup capture engine 220 can track multiple local backups stored in the local storage 204 as well as backups stored on external storage devices (e.g., external storage device 232).

The backup component 117 includes a backup restoration engine 222 to restore particular data from one or more backups, both remotely stored and locally stored. In some implementations, the backup restoration engine 222 provides a user interface (e.g., a graphical user interface) where a user can select the item(s) to be restored.

The search component 118 can search directly within the one or more applications 228 for current versions of files or other items. In addition, the search component 118 can search earlier versions of the files and other items using the backup component 117. For example, the search component 118 can provide a search interface within a backup user interface that allows searches of earlier versions of the files or other items. In addition, the search component 118 can provide a search interface within a user interface (e.g., a desktop user interface) that allows searches of the current version of the files or other items.

For example, the search component 118 can be used to initiate a search to find a particular item or element, for example, an image file. If this search finds the sought item, and if the item meets the user's expectations, there may be no need to do any further searching at that time. However, if the search does not find the sought item, or if the item that is found does not meet the user's expectations, the user can choose to perform a search of the backup data. In some implementations, the user activates a backup user interface to search the backup data.

An overlay engine 218 can generate a virtual file system for each respective local backup using the delta store 214. The backup component 117 can use the generated virtual file system to generate a corresponding visual representation of the local backup, for example, within the backup interface. The overlay engine 218 can generate the virtual file system on demand in response to a request, e.g., a request to display a visual representation of a particular backup, using the data in the delta store as well as the data of the current file system.

Figure 3:
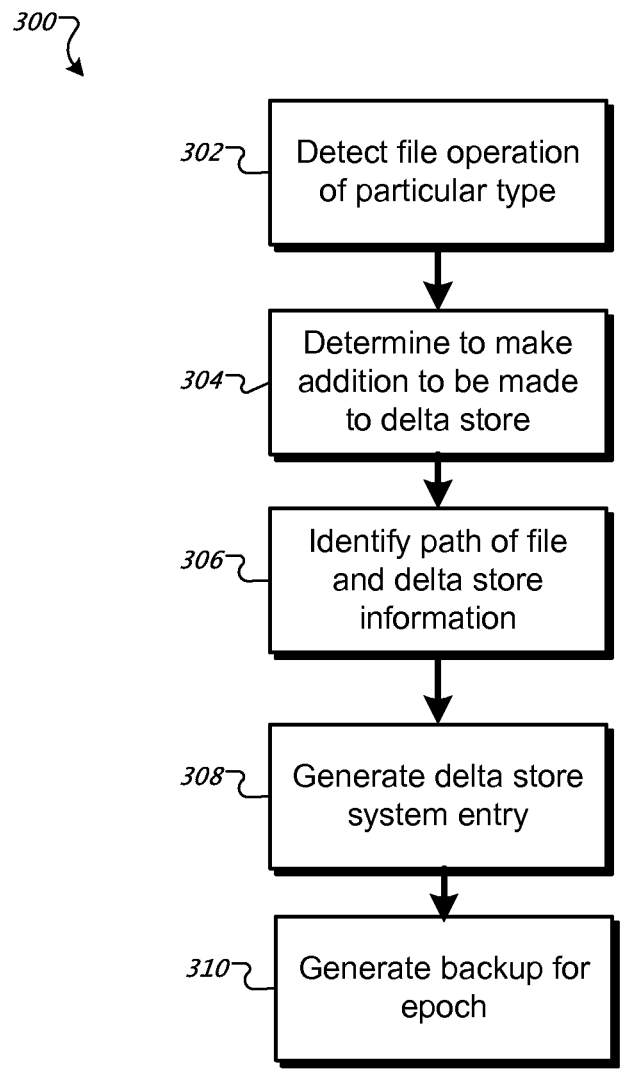
FIG. 3 is a flow diagram of an example process for generating a local backup.

FIG. 3 is a flow diagram of an example process 300 for generating a local backup. The process 300 can be performed by a system including one or more computing devices, for example, the computing device 102 of FIG. 1.

A file operation of a particular type is detected 302. In particular, files can have associated extended attributes indicating that a copy of the file should be stored in a backup prior to particular types of file operations (e.g., the file being modified or deleted). Additionally, the extended attribute can also indicate that a record should be made before a file is moved. That such an extended attribute exists can be indicated in a flag bit of a file i-node. The i-node is a unique identifier for each file.

Consequently, when a process calls into the kernel to perform a particular file operation, e.g., a write operation to modify the file, the kernel determines whether or not the flag bit is set for the file. If so, the associated extended attribute is read which indicates particular actions to be performed before allowing the write to occur. In particular, the extended attribute can indicate a file handler associated with the backup to be requested so that the file can be processed for the backup (e.g., a copy stored). Once the file handler has performed the requested action, the write operation on the file can be allowed to proceed. Additional details can be found in U.S. Provisional Patent Application No. 61/433,180, filed on Jan. 14, 2010, and entitled "File System Management" the contents of which are hereby incorporated by reference.

An addition is determined to be made to a delta store (304). For example, the determination can be based on the detection of the flag bit or the calling of the special file handler by the kernel. Thus, once the file handler is called, the determination can be made to store information in the delta store.

In some other implementations, a further determination is made based on whether or not there has already been an addition to the delta store for a particular backup made within a same epoch. For example, if the file has already been modified once during the epoch, the delta store is not modified for any subsequent modifications during the epoch. An epoch can be a period of time between designated backup points defining the contents of a given local backup (e.g., an hour). Thus, the file handler for the backup has been called and no other data associated with the file has been added to the delta store during the present epoch, then a determination can be made to make an addition to the delta store.

The path of the file and delta store information is identified (306). The path of the file is the directory path from a root to the file (e.g., naming directories from a root directory to the location of the file within the hierarchical file system). For example, a file path can be home/dir1/dir2/dir3/example.doc. The delta store information identified depends upon the type of file operation to be performed on the file. In some implementations, the delta store information includes the file data captured prior to an operation on the file being performed. In some other implementation, the delta store information only includes a marker or other metadata describing the file operation and allowing the virtual file system representation to be generated. The marker can indicate, for example, that the entry corresponds to a modification to the file, a deletion of the file, or a move of the file to a different location within the hierarchical file system.

A delta store entry corresponding to the file is generated (308). In particular, the delta store contents for a particular local backup operation can be generated dynamically as items are added during an epoch. The delta store entry includes data for the file, e.g., the file system marker and, in some examples, file data. For example, for files that were being modified, the entry includes the file data prior to the modification. Similarly, for a file to be deleted, the entry includes the file data prior to the deletion. The entry further includes a marker or other metadata indicating the nature of the entry (e.g., a modification, deletion, or move).

Additionally, the delta store entry can identify the portion of the file system corresponding to the path of the file. In particular, the local backup is built in the delta store as needed to store backup data. As a result, in a hierarchical file system, the directories in the path for the file may not exist in the delta store. However, when generating the corresponding virtual file system, fault directories can be generated in order to replicate the hierarchical file system for the path of the file corresponding to the current file system. Each fault directory or file can be a zero data file so that the virtual file system uses less storage space. Thus, for the example file above, each of dir1, dir2, and dir3 can be zero data fault files. Consequently, the fault directories allow for an on-demand directory hierarchy to be generated for the virtual file system.

A backup is created for the present epoch (310). For each epoch time, e.g., an hour, the data added to the delta store is used to define a particular backup or snapshot. Following creation of a given backup, backup data added to the delta store is associated with a next backup.

Additionally, the backup can add additional information to the delta store. In particular, additional entries can be added to the delta store for data items created during the epoch.

For example, if a new file is created during the epoch an entry can be made to the delta store including creating any necessary path directory fault files and including a creation marker. The creation marker indicates that the virtual file system generated from the backup should not include the file and any visual representation of the backup because the file did not exist prior to the backup. Thus, no file data is included in the entry to the delta store. New files being created can be identified using event reporting by applications, for example, though event notifications provided through the FSEvents API.

Figure 4:
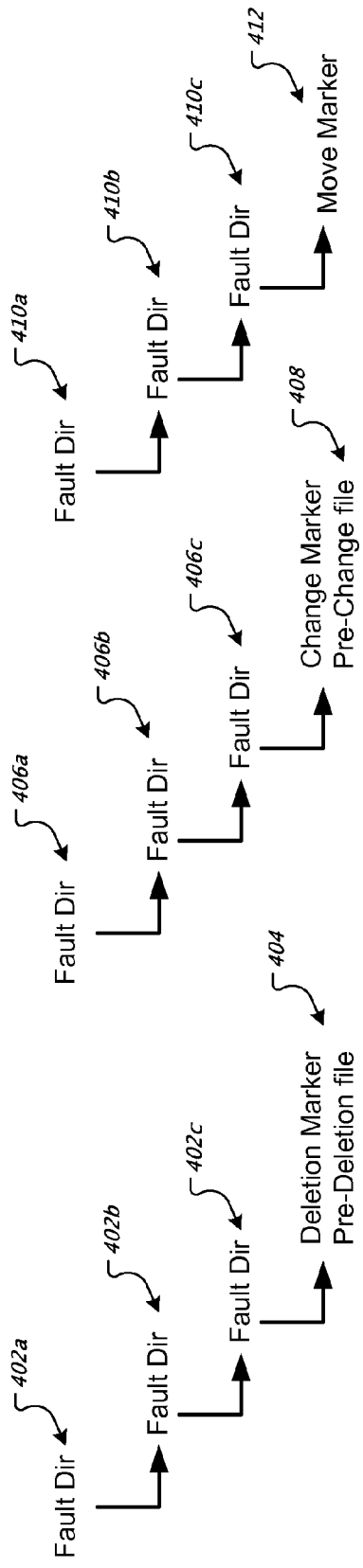
FIGS. 4A-4C are example diagrams of storing data in a virtual file system.

FIGS. 4A-4C are example diagrams showing a file system structure generated for a virtual file system. The virtual file system can be generated, for example, using data stored in the delta store. FIG. 4A shows a portion of a virtual file system generated when a file is being deleted within a particular epoch. In particular, FIG. 4A shows three fault directories 402a-c along the path of the file. The fault directories 402a-c correspond to the structure of the current file system hierarchy, but can have zero data.

The entry for the file 404 includes a deletion marker indicating that the file is being deleted and therefore should not be included in later backups. Additionally, the file data for the file prior to deletion is included in the backup so that it can be restored. Thus, when displaying a representation of the file system corresponding to the backup, the file corresponding to the entry will be presented as present in the file system. This is in contrast to entries for created items, which do not include the file data and do not present the newly created items when displaying a representation of the file system in the backup for that epoch (but will appear in representations of later backups unless deleted).

FIG. 4B shows three fault directories 406a-c along the path of the file. The fault directories 406a-c correspond to the structure of the current file system hierarchy, but can have zero data. The entry for the file 408 includes a change marker indicating that the file is being modified. Additionally, the file data for the file prior to modification is included in the backup. Thus, when displaying a representation of the file system corresponding to the backup, the unmodified file will be presented as present in the file system. Additionally, this version of the file can be restored from the locally stored backup.

FIG. 4C shows three fault directories 410a-c along the path of the file. The fault directories 410a-c correspond to the structure of the current file system hierarchy, but can have zero data. The entry for the file 412 includes a move marker indicating that the file is being moved. The move marker can further include a pointer identifying the moved location of the file. The file data, however, is not included since the current file system file has the same data, just the location has been changed.

Figure 5:
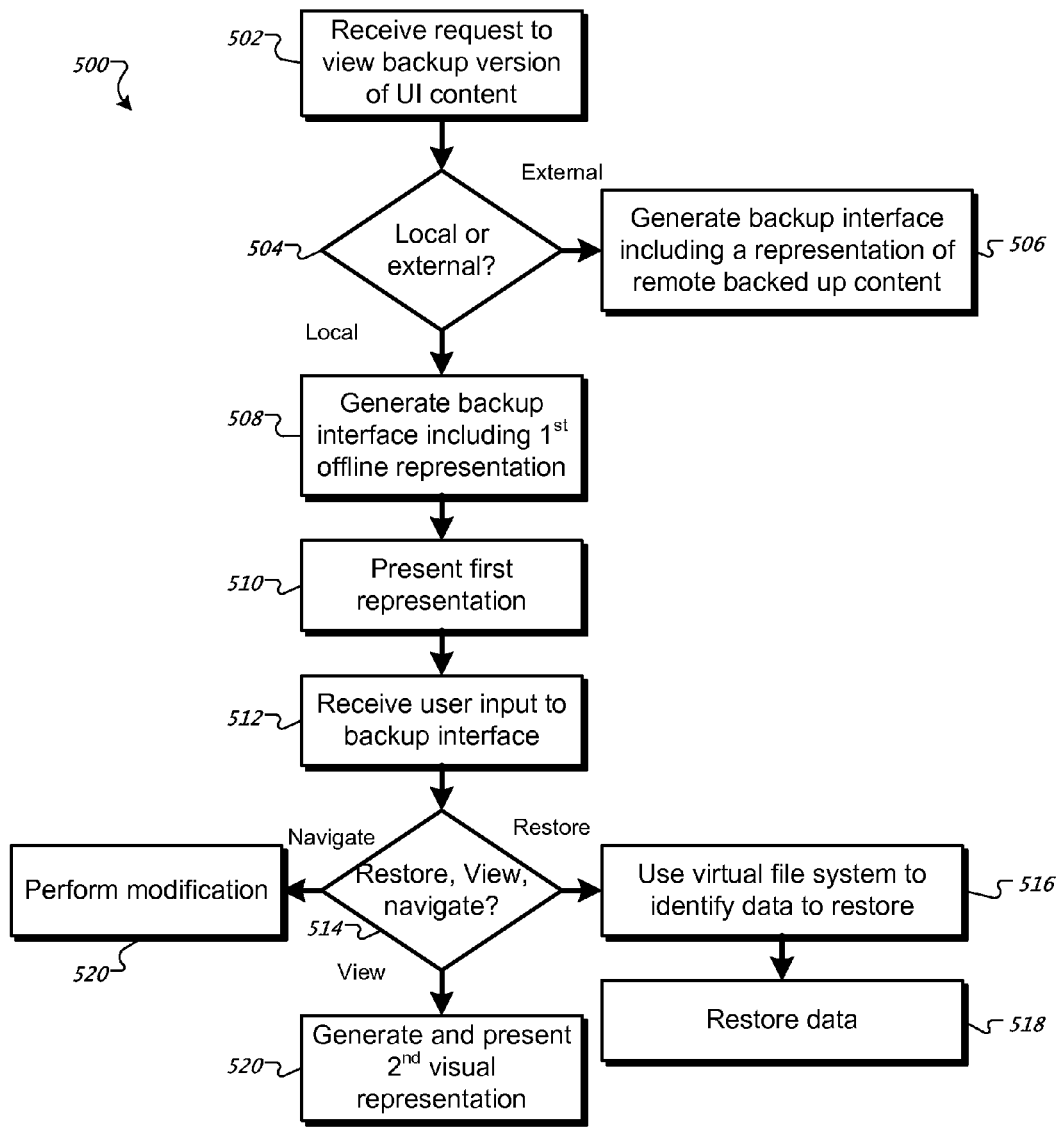
FIG. 5 is a flow diagram of an example process for displaying local backup data.

FIG. 5 is a flow diagram of an example process 500 for displaying local backup data. The process 500 can be performed by a system including one or more computing devices, for example, the computing device 102 of FIG. 1.

A request is received to view backup content (502). In some implementations, a user request to view backup content is submitted from a user interface window of the current file system (e.g., a window displaying folders or files of the current file system). For example, the user can submit the request in order to restore an earlier version of a file or restore a deleted file that is no longer present in the current file system. The window displaying content from the current file system can include an icon or menu item to enter a backup interface that can be selected by the user.

A determination is made as to whether local backups are the only available or whether backups stored on external storage device are available (504). For example, when the user's device is disconnected from an external storage device for storing backup data, only local backups may be available. Alternatively, when the user's device is connected to the external storage device, externally stored backup data is available.

When externally stored backups are available, a backup interface is generated including one or more representations of the backup content from the external storage backups (506). In some implementations, the backup interface provides one or more visual representations of the same file system window previously presented to the user. However, the content in the visual representations of the file system window correspond to the content present in the particular backup. For example, the window can display files or folders present in the backup of the file system.

In some implementations, the user can interact with the visual representations to select particular data items (e.g., for restoration) or to navigate the file system hierarchy (e.g., opening a folder to view the contents within another visual representation. A different visual representation can be presented for each backup, for example, one at a time or as part of a stack of visual representations to which the user can navigate. In some implementations, both any local backups locally stored and the externally stored local backups are both presented in the backup interface. The different types of backups can be differentiated in the backup interface, for example, using different visual cues (e.g., different colors or different visual effects such as badging) to distinguish the locally stored and externally stored backup data.

When only local backups are available, a first visual representation of a first local backup is generated (508). The first visual representation is generated using the virtual file system generated using data of the most recent local backup as well as the current file system data. Generating the first visual representation is described in greater detail below with respect to FIG. 6.

The first visual representation is presented, for example, within a backup interface (510). The first visual representation can be presented in a similar manner to the visual representations of externally stored backups. Thus, the first visual representation can present a file system window corresponding to the file system window previously presented to the user but with content corresponding to the particular local backup. The visual representation is tied to the underlying data of the virtual file system.

A user input is received in the backup interface (512). In particular, the user can interact with the visual representation, for example, to navigate within the file system of the backup as well as to select one or more displayed items for restoration. The user can also provide an input to view another visual representation corresponding to an earlier local backup. For example, a particular file the user is looking for may not be in the most recent local backup. Therefore, the user can look in an earlier backup.

A determination is made as to whether the input is a restore input, a request to view a visual representation of an earlier local backup, or a navigational input (514). If the input is a restore input, the virtual file system is used to identify corresponding data in the delta store to restore (516). The restore input can be received, for example, according to a user selection of one or more data items in the first visual representation. For example, the user can select one or more files for restoration. Data within the virtual file system corresponding to a selected file is identified. The data item is then restored to the current file system (518). Restoring can include replacing a current version of the data item with the restored version. Alternatively, restoring the data item can include copying the restored data item to the current file system such that both the existing version of the data item and the restored version are retained.

If the input is a navigation input, a corresponding modification is performed (520). For example, the navigation input can be to display a different level of the file system hierarchy of the backup (e.g., by opening a folder). The visual representation can be modified to present the selected portion of the file system. In another example, the navigation input can be to exit the backup interface. The backup interface can be dismissed (with or without animation) and the user returned to the same file system window from which the backup interface was invoked.

If the input is to view a visual representation of an earlier local backup, a second visual representation corresponding to the requested earlier local backup is generated and presented (520).

Figure 6:
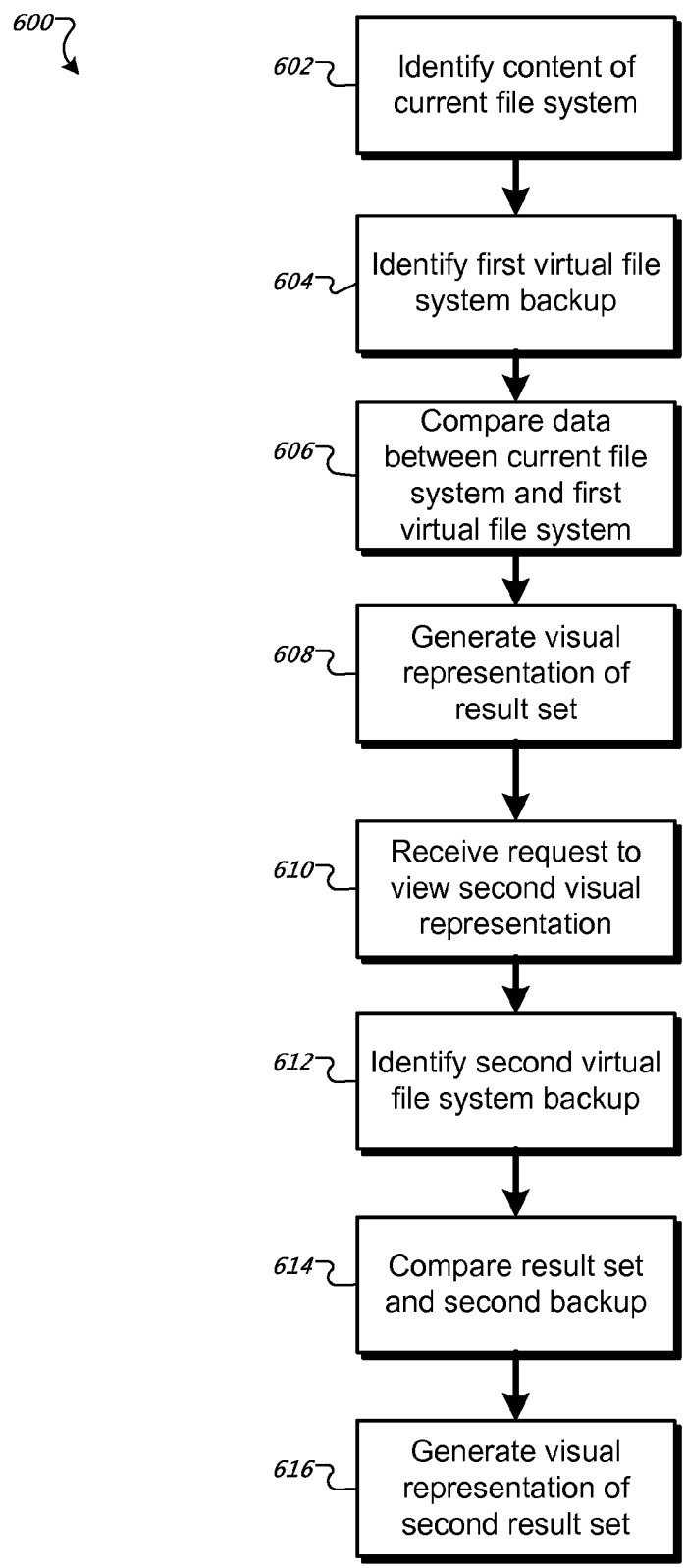
FIG. 6 is a flow diagram of an example process for generating a visual representation of a particular local snapshot.

FIG. 6 is a flow diagram of an example process 600 for generating a visual representation of a particular local backup. The process 600 can be performed by a system including one or more computing devices, for example, the computing device 102 of FIG. 1.

In response to the request to display a visual representation of the local backup, the contents of the current file system are identified (602). Data from a first virtual file system of a local backup is also identified (604). In some implementations, the first virtual file system data of the most recent local backup is identified. The first virtual file system data can be generated on the fly, e.g., in response to a request for a display of a particular local backup. The first virtual file system can be generated, for example, using data corresponding to the local backup located in a particular delta store of a local storage device. In some alternative implementations, a virtual file system is generated for each local backup using the delta store and stored, e.g., in the local storage device.

The current file system data is compared to the first virtual file system data (606). In some implementations, one or more set operations are performed to identify differences between the two file systems. These differences can indicate content to be added or removed from the visual representation of the backup relative to the current file system. For example, if the current file system does not include a particular file while the virtual file system does includes a file indicating that the file was deleted, then the file should be shown in any generated visual representation. Similarly, if a file exists in the current file system while a creation marker is present in the virtual file system, then the file should not be presented (the creation marker causes the file to be subtracted in the comparison). However, if the file exists in the current file system and the virtual file system does not include a marker for that file, then the file should be presented as the current file is consistent with the backup.

Whether to add or remove a particular data item such as a file as a result of the comparison depends on the particular virtual file system markers. Thus, starting with the full file system from the current file system, data items are added or subtracted based on the markers in the virtual file system. This allows for the generation of visual representations of the full backup file system using a reduced representation provided by the virtual file system.

A visual representation of the backup is generated from the result set of the comparison (608). The identified file system hierarchy of the result set is used to generate the visual representation of that file system hierarchy, in particular, the portion corresponding to the file system window that was previously being presented to the user prior to requesting the backup. Additional visual representations of different portions of the backup can be generated from the result set as the user navigates the visual representation.

A request is received to view a second visual representation corresponding to an earlier backup (610). In response to the request, a second virtual file system corresponding to the earlier backup is identified (612). In particular, the second virtual file system can correspond to the next earlier backup relative to the first virtual file system and can be generated in response to the request. A comparison is made between the previous result set (e.g., between the current and first virtual file system) and the second virtual file system (614). For example, the comparison can include one or more set operations as described above. A second visual representation is generated from the second result set.

In some implementations, the virtual file systems are cumulative such that in order to identify the content to display in a visual representation of a given backup, all virtual file system representations between the current file system and the backup content to be displayed are traversed. Thus, if the backup content of a fifth virtual file system corresponding to a fifth backup from the current file system is to be displayed, the fifth virtual file system is compared with a result set corresponding to a comparison of the prior result sets for each step from the current file system (e.g., between the current file system and the first virtual file system, between the first result set and the second virtual file system, etc.). While increasing processing for displaying older backups, each virtual file system is allowed to be more compact while being able to fully reconstruct the file system at that point in time.

Figure 7:
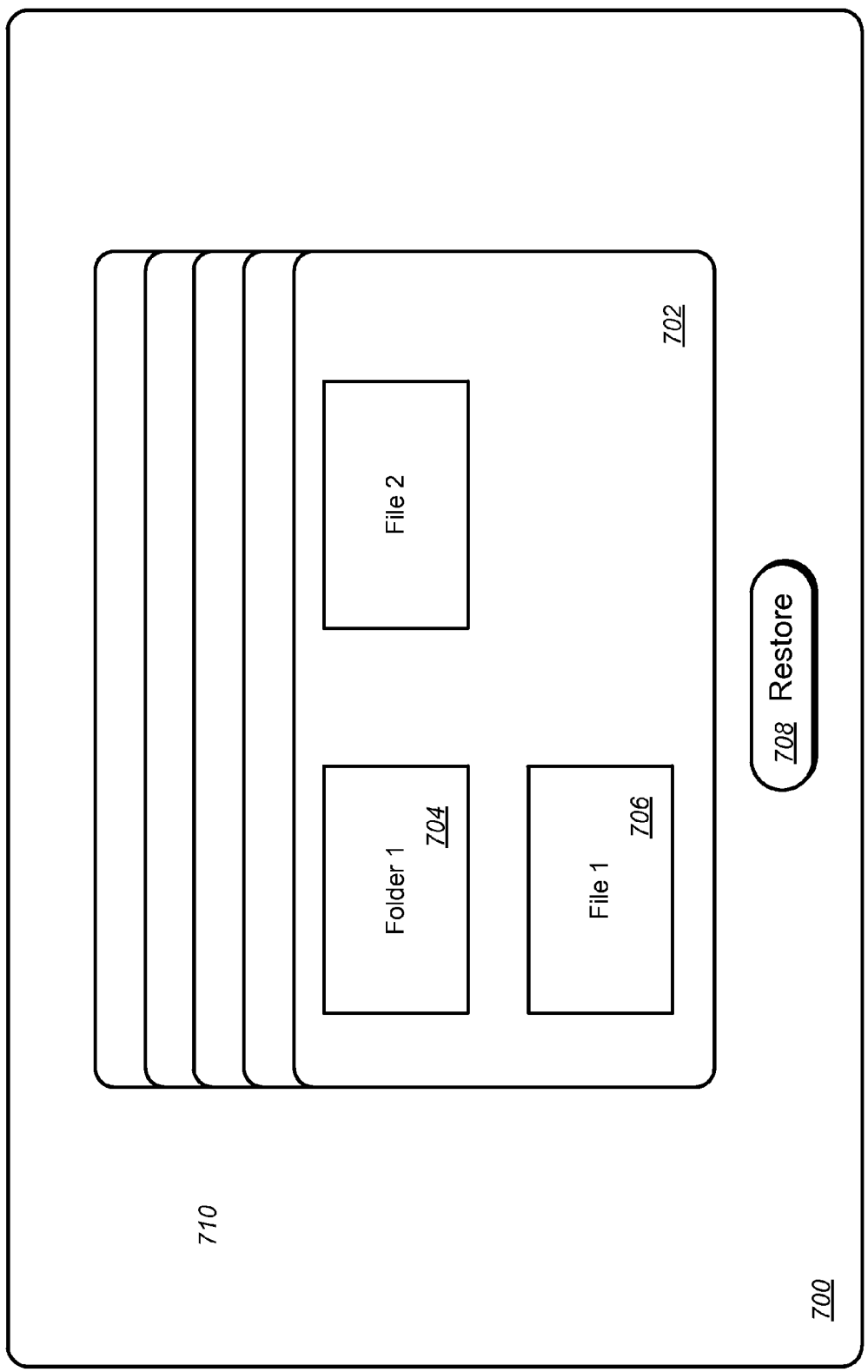
FIG. 7 is an example backup user interface.

FIG. 7 is an example backup user interface 700. The backup interface can be generated, for example, within a desktop user interface of a user's computing device in response to a user request to view backup data. In some implementations, the user request is initiated from a user interface window displaying particular current file system content (e.g., a particular directory of the file system). In some implementations, the backup interface is a window presented within the desktop user interface. In some other implementations, the backup interface is presented as an overlay to the desktop user interface such that only the backup user interface is visible.

The backup user interface 700 includes a first visual representation 702 of backup data. The first visual representation 702 can correspond to a visual representation of the same user interface window (e.g., as previously viewed by the user before initiating the backup interface), but displaying content corresponding to the backup as defined by the virtual file system. Thus, the first visual representation 702 presents the user interface window as it appeared at the time of the backup.

The first visual representation 702 is not an image; however, but an interactive representation from which the user can navigate the file system of the backup (e.g., by opening file 704 to view the corresponding contents) as well as select one or more items (e.g., item 706) for restoration, for example, by then selecting a restore button 708. Additional visual representations corresponding to other backups can be presented (e.g., as placeholders or actual backup visual representation). For example, a stack 710 can be used to represent additional backup visual representations in chronological order. In some implementations, the contents of each visual representation in the stack are generated upon selection, or are navigated to, by the user.

Figure 8:
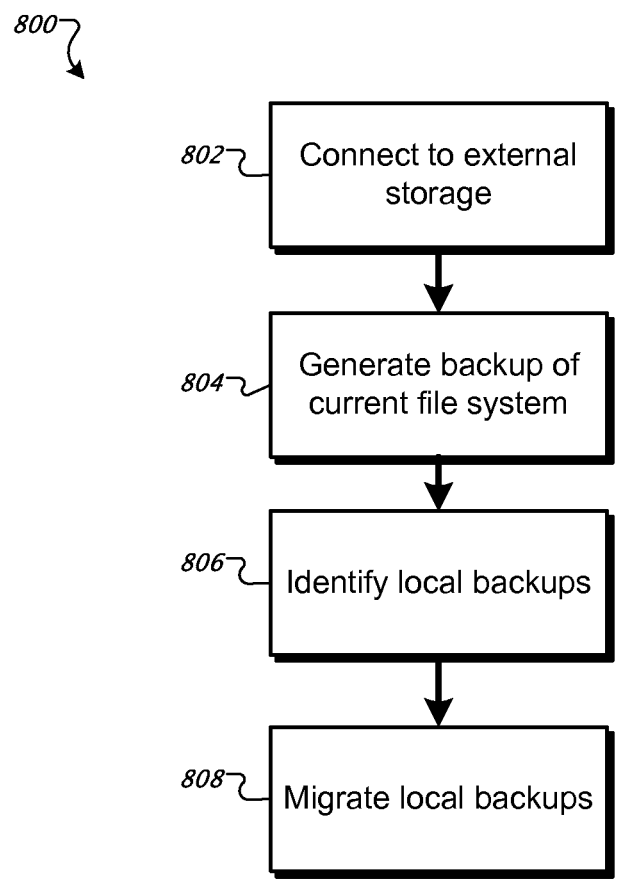
FIG. 8 is a flow diagram of an example process for migrating local backups to remote backups.

FIG. 8 is a flow diagram of an example process 800 for migrating local backups to remote backups. The process 800 can be performed by a system including one or more computing devices, for example, the computing device 102 of FIG. 1. For example, when a user reconnects to a remote storage device used for storing backups, the particular local backups that were generated for local storage while the remote storage device was disconnected can be migrated to backups for the remote storage device.

A connection is made with an external storage device (802). For example, the user a portable computing device can reconnect with an external storage location used for backups (e.g., an external storage disk, a server, a cloud storage location on a network, etc.).

A backup is generated of the current file system and stored on the external storage device (804). Thus, a backup is generated corresponding to the current file system existing on the user device (e.g., generated based on all changes between the previous backup on the external storage device and the current data).

Local backups for migration are identified (806). Since the current data has already been backed up, for each local backup there is already an older and a newer backup on the external storage device. For example, consider a scenario where the next newest backup on the remote storage device generated three hours ago is backup-3 and the newest backup just taken is backup-now. Additionally, there are two locally stored backups backup-1 and backup-2, where backup-1 was generated 1 hour ago and backup-2 was generated two hours ago. In some implementations, there may still be local backups stored that are older than the next externally stored backup (e.g., older than three hours in the example). These can be ignored since they are older than the externally stored backup.

Identified local backups are migrated to the external storage (810). In particular, in some implementations, the local backups are migrated from newest to oldest (e.g., first backup-1 and then backup-2). In order to migrate the local backups, the virtual file system entries are examined. For example, when looking at a particular folder, a determination needs to be made as to whether that folder has changed or whether anything within that folder is different than what was in either the latest externally stored backup or the previously stored external backup (e.g., backup-3 and backup-now). Whenever changed information is added to the virtual file system of a given backup, a marker or extended attribute is added to the virtual file system as well. This marker indicates that the item present in the virtual file system is a copy in the delta store of the local storage, not the original. Thus, this is likely an item that needs to be migrated to the external storage. These items are then copied and linked to identical content in other externally stored backups (e.g., using hardlinks). In particular, when migrating backup-1, items that are identified as the same as what is in the current disk (backup-now) (e.g., there is no corresponding virtual file system entry for unchanged items and therefore no marker) are linked to the matching path on the current backup (backup-now).

Items that are likely to be different based on the existence of the marker are compared directly to the corresponding item in the current backup (backup-now) and linked to the corresponding path in backup-now if they are identical, and then compared to the prior external backup (backup-3) and linked to the corresponding path there if identical. If neither matches, the content of the data is copied to the backup-1 being created (e.g., the data does not exist on any other backup). The process continues sequentially for each local backup. However, going back in time the comparison is not to the current backup but to the most closely generated external backup following the one being migrated. For example, after backup-1 has been migrated, when migrating backup-2 the comparison is between backup-3 and backup-1 instead of backup-3 and backup-now.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
  receiving a user input to present a visual representation of a first prior state of a file system, wherein the file system comprises one or more data items organized according to a hierarchy;
  generating the first visual representation of a first prior state of the file system, wherein generating the first visual representation comprises:
    determining a first result set based on a comparison between the file system and a first virtual file system associated with the first prior state of the file system; and
    generating the first visual representation base on the result set,
    wherein the first virtual file system comprises one or more hierarchically organized elements, the elements indicating changes introduced to the file system after a first time point associated with the first prior state of the file system
  presenting the first visual representation, the first virtual representation comprising a user-navigable representation of the data items and the hierarchy of the file system according to the first prior state;
  receiving a user input to present a second visual representation of a second prior state of the file system;
  generating the second visual representation of the second prior state of the file system, wherein generating the second visual representation comprises:
    determining a second result set based on a comparison between the first result set and a second virtual file system associated with the second prior state of the file system; and
    generating the second visual representation based on the second result set,
    wherein the second virtual file system comprises one or more hierarchically organized elements, the elements indicating changes introduced to the file system after a second time point associated with the second prior state of the file system;
  presenting the second visual representation, the second visual representation comprising a user-navigable representation of the data items and the hierarchy of the file system according to the second prior state;
  receiving an input to restore a particular data item presented in the first visual representation or the second visual representation;
  identifying backup data corresponding to the particular presented data item; and
  restoring the backup data to the file system.

2. The method of claim 1, where the input to present a first prior state is received while presenting a current file system interface window and where the generating includes presenting a visual representation of the same file system interface window corresponding to an earlier point in time.

3. A system comprising:
  one or more computing devices operable to perform operations including:
    receiving a user input to present a visual representation of a first prior state of a file system, where the file system comprises one or more data items organized according to a hierarchy;
    generating the first visual representation of a first prior state of the file system, wherein generating the first visual representation comprises:
      determining a first result set based on a comparison between the file system and a first virtual file system associated with the first prior state of the file system; and
      generating the first visual representation based on the result set,
      wherein the first virtual file system comprises one or more hierarchically organized elements, the elements indicating changes introduced to the file system after a first time point associated with the first prior state of the file system;
    presenting the first visual representation, the first visual representation comprising a user-navigable representation of the data items and the hierarchy of the file system according to the first prior state;
    receiving a user input to present a second visual representation of a second prior state of the file system;
    generating the second visual representation of the second prior state of the file system, wherein generating the second visual representation comprises:
      determining a second result set based on a comparison between the first result set and a second virtual file system associated with the second prior state of the file system; and
      generating the second visual representation based on the second result set,
      wherein the second virtual file system comprises one or more hierarchically organized elements, the elements indicating changes introduced to the file system after a second time point associated with the second prior state of the file system;

presenting the second visual representation, the second visual representation comprising a user-navigable representation of the data items and the hierarchy of the file system according to the second prior state;

receiving an input to restore a particular data item presented in the first visual representation or the second visual representation;

identifying backup data corresponding to the particular presented data item; and restoring the backup data to the file system.

4. The system of claim 3, where the input to present a first prior state is received while presenting a current file system interface window and where the generating includes presenting a visual representation of the same file system interface window corresponding to an earlier point in time.

5. A non-transitory computer storage medium encoded with a computer program, the program comprising instructions that when executed by data processing apparatus cause the data processing apparatus to perform operations comprising:

receiving a user input to present a visual representation of a first prior state of a file system, wherein the system comprises one or more data items organized according to a hierarchy;

generating the first visual representation of a first prior state of the file system, wherein generating the first visual representation comprises:

determining a first result set based on a comparison between the file system and a first virtual file system associated with the first prior state of the file system; and generating the first visual representation based on the result set, wherein the first virtual file system comprises one or more hierarchically organized elements, the elements indicating changes introduced to the file system after a first time point associated with the first prior state of the file system;

presenting the first visual representation, the first visual representation comprising a user-navigable representation of the data items and the hierarchy of the file system according to the first prior state;

receiving a user input to present a second visual representation of a second prior state of the file system;

generating the second visual representation of the second prior state of the file system, wherein generating the second visual representation comprises:

determining a second result set based on a comparison between the first result set and a second virtual file system associated with the second prior state of the file system; and generating the second visual representation based on the second result set, wherein the second virtual file system comprises one or more hierarchically organized elements, the elements indicating changes introduced to the file system after a second time point associated with the second prior state of the file system;

presenting the second visual representation, the second visual representation comprising a user-navigable representation of the data items and the hierarchy of the file system according to the second prior state;

receiving an input to restore a particular data item presented in the first visual representation or the second visual representation;

identifying backup data corresponding to the particular presented data item from the first virtual file system; and restoring the backup data to the file system.

* * * * *

UNITED STATES PATENT AND TRADEMARK OFFICE
CERTIFICATE OF CORRECTION

PATENT NO.       : 8,943,026 B2                         Page 1 of 1
APPLICATION NO.  : 13/350537
DATED            : January 27, 2015
INVENTOR(S)      : Giampaolo et al.

It is certified that error appears in the above-identified patent and that said Letters Patent is hereby corrected as shown below:

On title page 4, item [56], column 1, line 18, delete "Wellesly" and insert -- Wellesley --.

In the Claims

Claim 1, column 15, line 41, before "visual" insert -- first --.

Claim 1, column 15, line 45, after "representation of" delete "a" and insert -- the --.

Claim 1, column 15, line 52, after "representation" delete "base" and insert -- based --.

Claim 1, column 15, line 58, delete "system" and insert -- system; --.

Claim 1, column 15, line 59, delete "virtual" and insert -- visual --.

Claim 3, column 16, line 30, before "visual" insert -- first --.

Claim 3, column 16, line 34, after "representation of" delete "a" and insert -- the --.

Claim 5, column 17, line 21, before "visual" insert -- first --.

Claim 5, column 17, line 25, after "representation of" delete "a" and insert -- the --.

Signed and Sealed this
Fifth Day of May, 2015

Michelle K. Lee
*Director of the United States Patent and Trademark Office*